Patented June 15, 1943

2,322,012

UNITED STATES PATENT OFFICE 2,322,012

WAX MODIFYING AGENT AND METHOD FOR MAKING THE SAME

Per K. Frolich, Westfield, N. J., assignor to Standard Oil Development Company, a corporation of Delaware No Drawing. Application August 29, 1941,
Serial No. 408,715

10 Claims. (Cl. 252—59)

The present invention relates to wax modifying agents and to methods for making the same, and more especially to a new class of such materials. The present application is a continuation-in-part of my copending application Serial No. 210,165 filed on May 26, 1938. The invention will be fully understood from the following description.

Naphthenic acids occur in certain crude oils, notably those of the Gulf Coast regions, from California, Roumania, and Venezuela. These materials are removed from oils during refining treatment and may be recovered. It has been found that the materials are a good source of wax modifying agents, especially when condensed with halogenated or unsaturated aliphatic compounds having long chains. The wax modifying agents are used to depress the pour point of waxy lubricating oils and as aids in dewaxing of waxy oils.

The naphthenic acids referred to above occur as such in various types of oils, including the groups mentioned above and may be recovered in various ways. Sometimes such crude oils are distilled over caustic soda or lime and the soaps of the naphthenic acids are retained in the stills along with tar and asphaltic ingredients. The soaps may be recovered from these materials by washing with water, but difficulties are encountered with emulsions. Nevertheless, using alcohol the emulsions can be avoided and the acids recovered. The lighter acids are distilled over along with oil distillates and naphthenic acids are removed from these with caustic soda more readily than from the heavy still bottoms because they are not contaminated with large amounts of pitch and asphalt. In separating the acids from oils, one method is to wash with dilute caustic soda, say ½ to 5%, at a temperature above about 300° F., ordinarily not exceeding 500° F., and under a high pressure sufficient at least to prevent evaporation of the water. Under these conditions the acids are neutralized and are removed in the aqueous liquor which separates cleanly from the oil while at high temperatures. The oil does not dissolve in the aqueous solution to any appreciable extent and if the separation of the aqueous and oily layers is effected hot, there is little hydrolysis of the soaps, so that the acid is substantially completely removed from the oil. The acids can be recovered by acidification of the soap solutions with mineral acid which releases the naphthenic acids. These are then decanted and may be used as such, or they may be further purified, for example, by reconversion to soaps and reacidification or by distillation or similar processes.

Another method for recovering the acids consists in agitating a kerosene or gasoil distillate containing naphthenic acids with aqueous caustic soda, say 6° Bé., in amount sufficient to neutralize all of the acid, by blowing the mixture with air from 15 to 30 minutes. The mixture is then allowed to settle for about 1 hour and the lower or aqueous layer is pumped off. The aqueous layer is reacidified with mineral acid, for example, 98% sulphuric acid, and the naphthenic acid separates as an upper layer, which is drawn off and washed with water until free of mineral acid.

The products of these extractions are complex mixtures of acidic compounds containing at least one carboxyl grouping. No general chemical structure can as yet be given to this group of acids, since the structural analyses of only a few have so far been determined. Many of the compounds appear to be characterized by having in their molecular structure one or more relatively saturated hydrocarbon rings, hence these extracted products are considered to be naphthenic acids. It would seem that the higher molecular weight compounds contain polycyclic groupings. In this invention the more suitable naphthenic acids have molecular weights between about 100 and about 500, preferably between about 200 and about 250.

The acids recovered by one of the methods disclosed above are admixed with from 1 to 15 times their weight of a chlorinated paraffin wax or some equivalent chlorinated or unsaturated aliphatic compound containing a chain of at least 10 carbon atoms, and condensation is effected by means of aluminum chloride or other catalysts of the Friedel-Crafts condensation type such as zinc chloride, ferric chloride and the like. The aliphatic materials that can be used may be ethers, acids, esters or ketones and may be chlorinated just as the wax, or if unsaturated may be used as such. Chlorinated paraffin wax is preferred, and for this purpose it is chlorinated to the extent of about 10 to 30% of chlorine by weight, and preferably between about 10 and 14% of chlorine. The preferable catalyst is aluminum chloride and ordinarily this is used in an amount of 2 to 10% by weight, based on the chlorinated wax.

The condensation may be effected in the absence of any reaction medium or in the presence of a solvent such as naphtha or kerosene, carbon disulfide, or the inert chlorinated hydrocarbons, particularly the saturated compounds containing two or three carbon atoms and three or more halogen atoms, for example tetrachlor ethane. The reaction is brought about at temperatures ranging from about room temperature to 250° F., or 350° F., and it is found most desirable to begin the reaction at a relatively low temperature while adding the catalyst, then gradually raising the reaction mixture, and to maintain it for the major portion of the reaction period at a temperature from 250° F. to 300° F. The total reaction period is in some instances as low as one-half hour, but it is preferable to continue it for say 5 or 6 hours, and then to cool and hydrolyze the catalyst by adding alcohol, water or alkaline solutions.

The organic product of the condensation reaction may be separated from the sludge by extraction with kerosene or other similar solvent and the latter is then removed together with the lower boiling constituents by distilling under vacuum or with fire and steam up to a temperature of about 600° F. The desired product is recovered as a high boiling, high molecular weight distillation residue. Ordinarily the product at room temperatures is a viscous liquid of oily appearance but it may also be a solid with an oily or waxy appearance, and is freely soluble in mineral oil. The color of the product varies, depending upon the method of preparation, but is usually of a dark green to brown color.

The constitution of the wax modifying compounds disclosed herein is not understood at the present time. The product is of high molecular weight made by the union of several molecules of the naphthenic acid and aliphatic compounds. The molecular weight of the material ranges from about 500 to about 5,000 but usually and preferably the material has a molecular weight between about 750 and 2,000. The material is also substantially non-acid, and is largely free of acid and saponifiable materials. While its acid number may vary up to about 50 it is usually less than 10 or 20. The saponification number is normally below 75 but may be as high as about 100. In general, also, the material contains little or no chlorine. It would appear therefore that the carboxyl radical of the naphthenic acid is largely eliminated during the condensation and that the product is essentially a hydrophobic acid-free and non-saponifiable hydrocarbon polymeric condensation product of a reactive aliphatic compound having a chain of at least ten carbon atoms and a naphthenic acid.

The wax modifiers are mixed with waxy oils in proportion of say .1 to 5% in order to reduce the pour point of the waxy oil, the amount of the inhibitor depending to some extent on the quality of the particular inhibitor, reflecting the conditions under which it was prepared, and the particular materials used, but also on the particular oil to which it is added, and it is found that certain oils are naturally more susceptible to the action of pour point depressants than others. When used as a dewaxing aid, the materials are added in the same general proportion indicated above and the waxy oil is suitably diluted with a relatively large volume of a suitable dewaxing solvent and chilled to solidify the wax which is then removed mechanically by filtration, sedimentation or centrifugation. The solvents may be naphthas or kerosenes, or may be mixtures of organic solvents such as the low boiling alcohols or ketones with naphthas or low boiling aromatic hydrocarbons. The effect of the modifying agents is to greatly improve the ease of separation of the wax crystals, permit rapid chilling and produce a harder dryer wax cake.

The invention will be more fully understood from the following examples:

Example I 100 cc. of chlorinated paraffin wax (11% chlorine) of 34° A. P. I. gravity were placed in a flask and 100 grams of naphthenic acid (acid No. 212.5; saponification No. 214.84 mg. KOH/gram) were added. The contents of the flask were then raised to 130° F., and stirring was begun with a mechanical agitator. To this mixture 50 grams of aluminum chloride were then added over a period of one-half hour and the temperature was then slowly raised to 300° F., and held at that temperature to the end of the reaction period, which in this instance was five hours in all. During this reaction hydrochloric acid was evolved and removed from the flask. When the reaction period was over, the flask was cooled to about 125° F., and was diluted with 1000 cc. of kerosene and then neutralized by adding water and alcohol which hydrolyzed the catalyst. The kerosene extract separated from the aqueous and sludge layer and was withdrawn, distilled with fire and steam to a temperature of 600° F. so as to recover the wax modifying agent as a residue. The product had a Saybolt viscosity of 990 seconds at 130° F., 186 seconds at 210° F.; it had an acid number of 4.3 and a saponification number of 8.3 mg. KOH/gram.

The yield of this product was about 40.5% based on chlor wax. When 5% of this product was added to a waxy oil having a pour point of 30° F., it was found that the pour point was reduced to +5° F.

Example II

The experimental conditions of Example I were followed explicitly in this test except that 100 grams of aluminum chloride were used in place of the 50 grams employed in the former experiment. The product was similar to that of the prior example, but 1% reduced the pour point of the waxy oil from 30° F. to +15° F., while 5% reduced the pour point of the same oil to −5° F.

Example III

In this example the conditions were the same as in Example I except that the total reaction period was two hours instead of five hours. The pour point of the waxy oil was reduced from 30° F. to 10° F., using 5% of this material.

Example IV

This example is presented as an investigation of the mechanism of the reaction in the preparation of the wax modifying agent of the invention.

Eighty-six grams (100 cc.) of chlorinated paraffin wax (12% chlorine) were placed in a flask and 100 grams of naphthenic acids (acid number, 220; saponification number, 220 mg. KOH/gram) were added. The contents of the flask were then raised to 130° F., and stirring was begun with a mechanical stirrer. To this mixture 100 grams of $AlCl_3$ were then added over a period of one hour and the temperature then slowly raised to 300° F. and held there for one hour.

It was found necessary to discontinue the reaction at this point because the reaction mixture had become so viscous that further agitation became impossible with the equipment at hand. The flask was cooled to about 125° F. and was diluted with about 1000 cc. of kerosene and the catalyst destroyed by adding 500 cc. of a mixture of water and isopropyl alcohol. The kerosene extract separated from the aqueous sludge layer and was withdrawn and distilled with fire and steam. The kerosene was removed by distillation up to approximately 475° F. at which point the unreacted wax was detected coming over in the distillate as determined by its dropping upon a piece of ice. Accordingly, a separation was made between the kerosene and wax cut. The kerosene fraction so obtained measured 830 cc. and on analysis gave a zero value for both the neutralization and saponification number.

The distillation was continued to a temperature of 600° F., giving the following products:

|  | Distillate "wax cut" | Residue |
| --- | --- | --- |
| Quantity (in grams) | 41 | 45 |
| Neutralization number | 5.0 | 15.4 |
| Saponification number | 5.4 | 66.4 |

The data with regard to the "wax cut" distillate indicate that the unreacted "wax cut" contains some naphthenic acids. Assuming them to be the original naphthenic acids added to the reaction mixture, calculations indicate that they are present to the extent of 2.3% in the overhead wax cut. This further indicates that of the 100 grams of naphthenic acids added to the reaction mixture only 0.9% distilled overhead on recovery of the product.

The data with regard to residue indicate that some ester type materials are present, undoubtedly of naphthenic acid origin, together with some free naphthenic acids. By calculation these latter comprise some 7% of the product obtained or 3% of the original naphthenic acids added to the reaction mixture. These data definitely prove that the naphthenic acids participate in the reaction. It is possible that the relatively high saponification value obtained may afford some clue as to the mechanism of the reaction, in that esters may be the "intermediate precursors" to the final product, whatever this may be. On the assumption that the ester is the result of the combination of chlor-wax with the naphthenic acids, it can be shown by calculation that the amount present will account for only 10.3% of the original naphthenic acids added to the reaction mixture.

Summing up the above data we can now present the following inventory:

|  | Per cent naphthenic acid of original charge |
| --- | --- |
|  | Per cent |
| In kerosene fraction overhead | 0.0 |
| In "wax cut" overhead | 0.9 |
| In product: |  |
| (A) As free acid | 3.0 |
| (B) As esters | 10.3 |
| Total accounted for | 14.2 |

The data definitely demonstrate that the naphthenic acids participate in the reaction, but the role of the "esters" is not clear. It is clear that 85.8% of the naphthenic acids were converted, in the course of the reaction, into non-saponifiable materials. The measurable neutralization and saponification numbers indicative of naphthenic acids in the product are capable of being reduced by additional reaction time, as illustrated by Example I. Accordingly it is believed that the free naphthenic acids are not an essential part of the product but are present as an impurity and that it is substantially acid free and non-saponifiable.

When 1% of the product was added to a waxy oil having a pour point of 30° F., it was found that the pour point was reduced to 20° F.

The present invention is not to be limited by any theory of the mechanism of the reaction or the nature of the particular ingredients but only to the following claims in which it is desired to claim all novelty inherent in the invention.

What is claimed is:

1. An improved wax modifying compound comprising essentially a substantially acid-free condensation product of a reactive aliphatic compound having a chain of at least 10 carbon atoms and a naphthenic acid.

2. An improved wax modifier comprising essentially a high boiling substantially acid-free condensation product of chlorinated paraffin wax and a naphthenic acid.

3. An improved wax modifier comprising essentially a high boiling substantially acid-free condensation product of chlorinated paraffin wax and a naphthenic acid, produced by means of a Friedel-Crafts reaction catalyst and having pour depressing properties.

4. An improved wax modifying compound comprising essentially a high boiling substantially acid-free and non-saponifiable condensation product of paraffin wax chlorinated to about 10 to 14% and a minor proportion of a naphthenic acid, produced through the action of aluminum chloride and having pour inhibiting properties.

5. Product according to claim 4 in which the proportion of naphthenic acid is about 10% of the chlorinated wax.

6. Product according to claim 4 in which the naphthenic acid is about 10% of the chlorinated wax and the condensation is effected at a temperature between about room temperature and 300° F.

7. A lubricating composition comprising a waxy mineral oil and a substantially acid-free condensation product of a reactive aliphatic compound, having a carbon chain of at least 10 carbon atoms, and a naphthenic acid, the mixture having a pour point below that of the waxy oil.

8. A lubricant comprising a waxy mineral oil and a small proportion of a heavy substantially acid-free condensation product of a chlorinated paraffin wax and naphthenic acid, the mixture having a lower pour point than that of the waxy oil.

9. A lubricant comprising a waxy mineral oil and 0.1 to 5% of a heavy substantially acid-free condensation product of chlorinated paraffin wax and naphthenic acid, the mixture having a lower pour point than the waxy oil.

10. A lubricant comprising a waxy mineral oil, from .1 to 5% of a heavy substantially acid-free and non-saponifiable condensation product of paraffin wax containing 10 to 14% chlorine and 10% by weight thereof of a naphthenic acid, the condensation product produced at a temperature from about room temperature to 300° F., using aluminum chloride as the catalyst.

PER K. FROLICH.